United States Patent
Marinet et al.

(10) Patent No.: US 12,353,886 B1
(45) Date of Patent: Jul. 8, 2025

(54) ADJUSTING INSTRUCTION EXECUTION FOR ENHANCED SECURITY

(71) Applicant: QUALCOMM Incorporated, San Diego, CA (US)

(72) Inventors: Fabrice Marinet, Chateauneuf-le-Rouge (FR); Florian Reneld Ghislain Caullery, Cannes (FR); Frederic Amiel, Nice (FR); Anton Dumas, Odenas (FR)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 18/408,442

(22) Filed: Jan. 9, 2024

(51) Int. Cl.
  *G06F 9/38* (2018.01)
  *G06F 9/30* (2018.01)
(52) U.S. Cl.
  CPC ........ *G06F 9/3887* (2013.01); *G06F 9/30145* (2013.01)
(58) Field of Classification Search
  CPC ............................ G06F 9/3887; G06F 9/30145
  See application file for complete search history.

(56) References Cited

U.S. PATENT DOCUMENTS

| | | | | |
|---|---|---|---|---|
| 2013/0262824 | A1* | 10/2013 | Arakawa | G06F 9/3887 712/205 |
| 2014/0281397 | A1* | 9/2014 | Loktyukhin | G06F 9/30181 712/208 |
| 2018/0095897 | A1* | 4/2018 | Upasani | G06F 21/6218 |
| 2019/0212984 | A1* | 7/2019 | Boersma | G06F 7/57 |
| 2023/0418612 | A1* | 12/2023 | Du Bois | G06F 9/30181 |

* cited by examiner

*Primary Examiner* — Zachary K Huson
(74) *Attorney, Agent, or Firm* — Polsinelli

(57) ABSTRACT

Systems and techniques are provided for secure computing systems. For example, a process can include obtaining a plurality of instructions, wherein the plurality of instructions comprises a sequential order for execution of the plurality of instructions by a processor. The process can include determining that two or more instructions of the plurality of instructions are capable of being fused. The process can include determining that a random variable satisfies an instruction fusion condition. The process can include executing, based on determining that the two or more instructions of the plurality of instructions are capable of being fused and the random variable satisfies the instruction fusion condition, the two or more instructions of the plurality of instructions as a single fused instruction.

20 Claims, 12 Drawing Sheets

| Idiom | Instruction Fusion Candidate Operations |
|---|---|
| Indexed Loads | add + ld |
| Load Address | slli + add |
| Clear Upper Bits | slli + srli |
| Far Jumps | auipc + jr |
| 32-Bit Immediate | lui + addi or lui + ld |
| Two-Reg + Immediate Arithmetic | (add rd, rs1, imm) + (add rd, rs2, imm) |
| Post-Increment Load & Store | ld + add or st + add |
| Load Pair | ld + ld |
| Store Pair | st + st |
| Global Loads | auipc + lw |
| Other Idioms | - |

FIG. 3B

| Idiom | Macro-Operation Sequence | Idiom Enable |
|---|---|---|
| Indexed Loads | add + ld | 0 |
| Load Address | slli + add | 1 |
| Clear Upper Bits | slli + srli | 1 |
| Far Jumps | auipc + jr | 0 |
| 32-Bit Immediate | lui + addi or lui + ld | 0 |
| Two-Reg + Immediate Arithmetic | (add rd, rs1, imm) + (add rd, rs2, imm) | 1 |
| Post-Increment Load & Store | ld + add or st + add | 1 |
| Load Pair | ld + ld | 0 |
| Store Pair | st + st | 1 |
| Global Loads | auipc + lw | 1 |
| Other Idioms | - | - |

FIG. 6B

ADJUSTING INSTRUCTION EXECUTION FOR ENHANCED SECURITY

FIELD

Aspects of the present disclosure relate to systems and techniques for providing enhanced security for computing systems. For example, according to some aspects, the systems and techniques can adjust instruction execution for enhanced security.

BACKGROUND

Computing devices often employ various techniques to protect data. As an example, data may be subjected to encryption and decryption techniques in a variety of scenarios, such as writing data to a storage device, reading data from a storage device, writing data to or reading data from a memory device, encrypting and decrypting blocks and/or volumes of data, encrypting and decrypting digital content, performing inline cryptographic operations, etc. Such encryption and decryption operations are often performed, at least in part, using a security information asset, such as a cryptographic key, a derived cryptographic key, etc. Certain scenarios exist in which attacks are performed in an attempt to obtain such security information assets. Accordingly, it is often advantageous to implement systems and techniques to protect such security information assets.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for adjusting instruction execution for enhanced security. According to at least one example, a method is provided for secure computing. The method includes: obtaining a plurality of instructions, wherein the plurality of instructions comprises a sequential order for execution of the plurality of instructions by a processor; determining that two or more instructions of the plurality of instructions are capable of being fused; determining that a random variable satisfies an instruction fusion condition; and executing, basing on determining that the two or more instructions of the plurality of instructions are capable of being fused and the random variable satisfies the instruction fusion condition, the two or more instructions of the plurality of instructions as a single fused instruction.

In another example, an apparatus for secure computing is provided that includes at least one memory and at least one processor coupled to the at least one memory. The at least one processor is configured to: obtain a plurality of instructions, wherein the plurality of instructions comprises a sequential order for execution of the plurality of instructions by a processor; determine that two or more instructions of the plurality of instructions are capable of being fused; determine that a random variable satisfies an instruction fusion condition; and execute, based on determining that the two or more instructions of the plurality of instructions are capable of being fused and the random variable satisfies the instruction fusion condition, the two or more instructions of the plurality of instructions as a single fused instruction.

In another example, a non-transitory computer-readable medium is provided that has stored thereon instructions that, when executed by one or more processors, cause the one or more processors to: obtain a plurality of instructions, wherein the plurality of instructions comprises a sequential order for execution of the plurality of instructions by a processor; determine that two or more instructions of the plurality of instructions are capable of being fused; determine that a random variable satisfies an instruction fusion condition; and execute, based on determining that the two or more instructions of the plurality of instructions are capable of being fused and the random variable satisfies the instruction fusion condition, the two or more instructions of the plurality of instructions as a single fused instruction.

In another example, an apparatus for secure computing is provided. The apparatus includes: means for obtaining a plurality of instructions, wherein the plurality of instructions comprises a sequential order for execution of the plurality of instructions by a processor; means for determining that two or more instructions of the plurality of instructions are capable of being fused; means for determining that a random variable satisfies an instruction fusion condition; and means for executing, based on determining that the two or more instructions of the plurality of instructions are capable of being fused and the random variable satisfies the instruction fusion condition, the two or more instructions of the plurality of instructions as a single fused instruction.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures:

FIG. 3B is a diagram of an example idiom catalog, in accordance with some examples of the present disclosure;

FIG. 6B is a diagram of an additional example idiom catalog, in accordance with some examples of the present disclosure;

DETAILED DESCRIPTION

Figure 1:
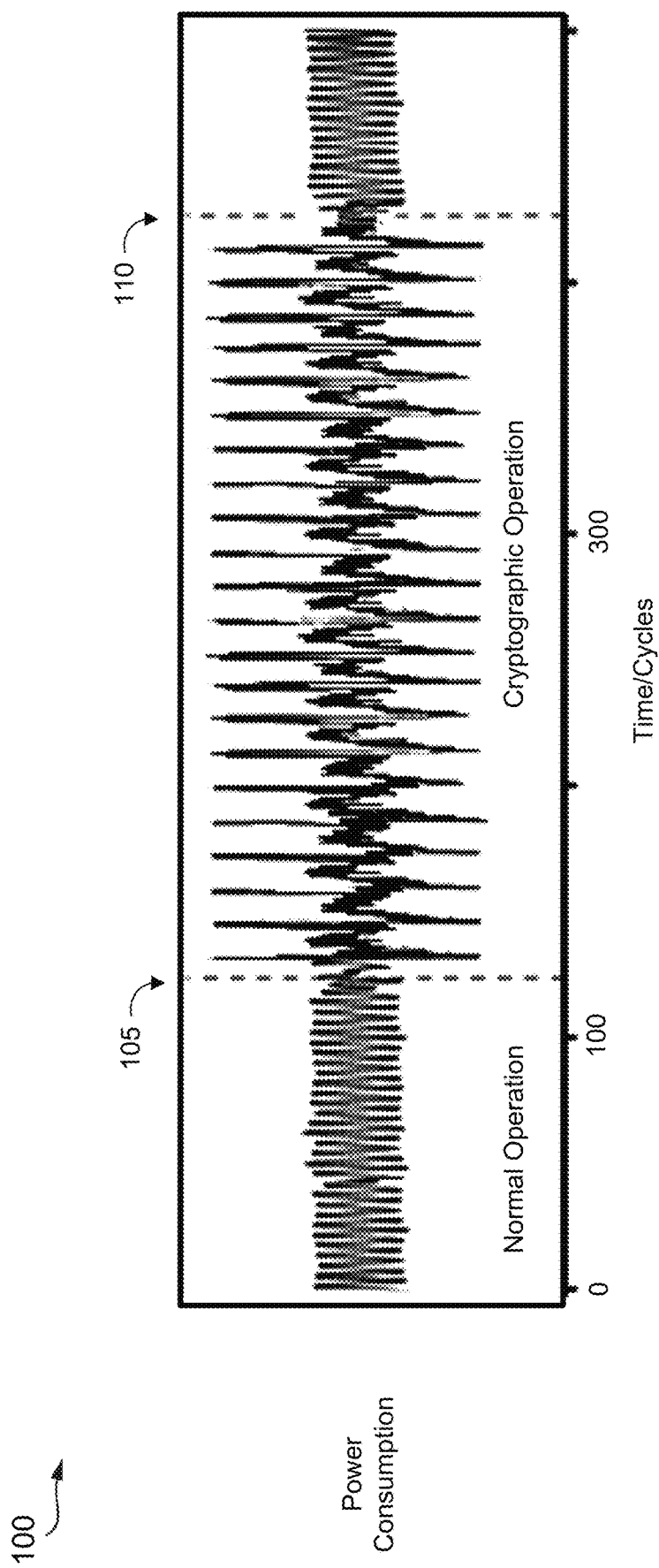
FIG. 1 is a diagram illustrating how a security operation can reveal specific moments in time where sensitive data are processed, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Computing devices often employ various techniques to protect data. As an example, data may be subjected to encryption and decryption techniques in a variety of scenarios, such as writing data to a storage device, reading data from a storage device, writing data to or reading data from a memory device, encrypting and decrypting blocks and/or volumes of data, encrypting and decrypting digital content, performing inline cryptographic operations, etc. Such encryption and decryption operations are often performed, at least in part, using a security information asset.

In some examples, a security information asset may be a cryptographic key, a cryptographic sub-key, a secondary key, a derived cryptographic key, and/or any other security information asset used for encrypting and/or decrypting data and/or ensuring authenticity of data used by a computing device. Such a security information asset may be stored in secure information storage. In one illustrative example, security information assets can include private keys (also referred to herein as secret keys) of a symmetric cryptographic cypher and/or private keys of an asymmetric cryptographic cypher. In some cases, the secure information storage can include a security information asset storage device (e.g., one-time programmable (OTP) storage, non-volatile memory device, flash storage device, etc.). Security information assets may be obtained from the security information asset storage device during execution of a computing device (e.g., at boot, reboot and/or during updates), stored in a separate storage device, and provided as needed to security components (e.g., cryptographic engines, key tables, key derivation functions, etc.) for performing security operations (e.g., encryption and/or decryption of data). Security information assets so obtained may be directly used by any number of security components and/or may be used for deriving additional security information assets (e.g., derived keys used by cryptographic engines for encrypting and/or decrypting data), which is an example of a security operation. In some cases, security operations can include other steps or transformations using security information assets without departing from the scope of the present disclosure.

In some aspects, as discussed above, security components of a computing device may require a security information asset (e.g., a cryptographic key) to perform one or more security operations (e.g., encrypting and/or decrypting data, generating derivative cryptographic keys, any other steps and or transformations performed using a security information asset, etc.).

However, use and/or repeated reuse of security information assets may allow an attacker to use various techniques to obtain all or any portion of a security information asset, which may potentially compromise the security of a computing device. As an example, an attacker may employ fault injection techniques (e.g., laser fault injection, power fault injection, bulk bias injection). In some cases, fault injection techniques may be used to compromise the security of a computing device during a single operation.

In some cases, an attacker can utilize a machine learning (ML) model (e.g., a deep learning neural network) to aid in a side channel attack. As an example, an attacker may perform a side channel attack by using a measurement device (e.g., an oscilloscope) to measure any number of characteristics of a computing device as it operates (e.g., voltages, power, electromagnetic outputs, timing information, sound, temperature, etc.). In some aspects, side channel attacks based on statistical data analysis (also referred to herein as statistical side channel attacks) may primarily be useful when a security operation is performed a large number of times. For example, statistical side channel attacks may include measuring one or more characteristics of a computing device when multiple operations transferring the same and/or related security information assets are performed, and/or when performing operations using the same and/or related security information assets as operands, etc. (collectively referred to herein as security operations) may allow an attacker to obtain all or any portion of a security information asset, thereby potentially compromising the security of the computing device.

In some cases, if an attacker can determine the timing of operations transferring security operations, a measurement device can capture characteristics of the computing device at a high resolution on the time scale. In some cases, the amount of data that can be captured by an attacker can be limited by an amount of storage available in a measurement device. In one illustrative example, an oscilloscope may include a measurement buffer (e.g., memory) that can store at most one million measurements. In some cases, if an attacker can determine the timing of a 100 millisecond (ms) security operation within one ms, the measurement time scale can be approximately 100 nanosecond (ns). However, if the timing of the 100 ms operation is unknown to the attacker, the measurement time scale (e.g., 1 microsecond, 10 microseconds, and/or any other suitable timescale) can be significantly longer than the measurement timescale when timing information is known. In some cases, the data transfer, data storage, and/or data processing requirement for longer measurement timescales can be significantly more expensive to store and process on an attacker's device (e.g., a high-order differential power analysis, a deep learning ML attack, or the like) to extract useful information relative to an attack where timing information is known.

In some cases, an attacker using a side channel attack or a fault injection attack repetitively as a cryptographic key is being transmitted and/or received (e.g., when obtained from a security information asset storage device at boot time, when obtained from a different storage device, when provided to security components for use in performing security operations, etc.), used to derive other cryptographic keys, etc. may be able to deduce the cryptographic key, and thus be able to use the key to decrypt data on the computing device and/or encrypt potentially malicious data using the correct key, which may then be used by the computing device.

Many techniques have been developed to reduce the vulnerability of security operations to side channel attacks. For example, some techniques can include hiding security operations, imposing constant timing, imposing variable timing, performing specialized operations, adding redundant operations (e.g., dummy operations), or the like. However, in some cases, security operations may remain identifiable due to similarity of execution of instructions carried out at different times. In some cases, one or more techniques can be implemented in software executed by a computing system. Accordingly, it would be beneficial to provide systems and techniques that reduce similarity of operations performed at different types to improve security against side channel attacks.

Systems, apparatuses, electronic devices, methods (also referred to as processes), and computer-readable media (collectively referred to herein as "systems and techniques") are described herein for adjusting instruction execution for increased security. In some aspects, adjusting instruction execution (e.g., by varying the number of clock cycles used to execute instructions) can result in variations in the timing of signals that can be detected by an attacker.

In some cases, the systems and techniques described herein may fuse instructions during instruction decode and/or execution phases. In some implementations, adjusting instruction execution can include fusing two (or more) instructions that may typically be decoded and/or executed sequentially (e.g., in sequential cycles) into a single instruction that can be executed simultaneously. As used herein, "fusion" refers to combining decoding and/or execution of the two or more ISA instructions into a single instruction. For example, instructions included in an instruction set architecture (ISA) of a processor may typically be executed sequentially by the processor. As used herein, instructions included in an ISA of a processor can be referred to as ISA instructions.

In some examples, the systems and techniques described herein may determine that two ISA instructions scheduled to be performed sequentially may be compatible for fusion. For example, the systems and techniques may determine that two ISA instructions are compatible because the two instructions do not use the same hardware resources (e.g., arithmetic logic units (ALUs), load/store units (LSUs), memory controllers, branch units, registers, or the like) available inside of the processor. As used herein, simultaneously executing two ISA instructions refers to executing a first instruction of the two ISA instructions with a first subset of the hardware resources available to a processor and executing a second instruction of the two ISA instructions with a second subset of the hardware resources available to the processor, different from the first subset of hardware resources available to the processor, for at least one clock cycle. In some implementations, more than two ISA instructions may be performed simultaneously without departing from the scope of the present disclosure.

As used herein, "idioms" refers to groups instructions that are compatible with fusion. In some cases, instructions compatible with fusion can be included in an idiom catalog. In some aspects, when an idiom is detected during fetching of ISA instructions, a random variable can be used to determine whether to fuse the ISA instructions included in the idiom or to perform the ISA instructions sequentially. In some cases, implementing instruction fusion may increase the efficiency of a processor by reducing the total number of cycles required to execute fused instructions simultaneously relative to sequential execution of the same instructions.

In some implementations, the systems and techniques can include fission (e.g., division) of instructions during decode and/or execution. For example, fission can include dividing an ISA instruction into two or more instructions. For example, an ISA instruction (e.g., add+multiply) may be substituted with two or more other ISA instructions (e.g., add then multiply). In some cases, a fission catalog can include ISA instructions that are compatible with fission. In some examples, a random variable can be used to determine whether to perform fission on ISA instructions into multiple instructions or to execute the ISA instruction as a single instruction.

In some cases, by adjusting instruction execution, (e.g., performing fusion of ISA instructions, performing fission of ISA instructions), similar operations performed at different times can incorrectly appear, to an attacker, to be different operations. Accordingly, adjusting instruction execution may obfuscate a security information asset such that attackers (e.g., performing side channel attacks, fault injection attacks, etc.) may be less likely to discern all or any portion of the security information asset, and, as such, be less able to compromise the security of a computing device.

Various aspects of the systems and techniques described herein will be discussed below with respect to the figures.

FIG. 1 illustrates a waveform 100 of a security operation that may reveal timing information to an attacker. For example, an attacker may attempt to analyze the waveform 100 to obtain information about one or more precise moments in time when the most sensitive security information assets are being processed. As illustrated, power fluctuations between a beginning 105 and an end 110 of an AES encryption operation (e.g., a security operation) can differ from power fluctuations before the beginning 105 and after the end 110 of the AES encryption operation can differ from the power fluctuations during the AES encryption operation. While an AES encryption option is provided as an example, other security operations, including but not limited to number theoretic transform (NTT) computations, matrix vector multiplication (A*y), r and r.G multiplication (e.g., elliptic curve point multiplication) events (e.g., for an elliptic curve digital signature algorithm (ECDSA)), security hash algorithms, (e.g., SHA-256, SHA-3), McEliece cryptography, bit flipping key encapsulation (BIKE), Hamming quasi-cycling (HQC) encryption, hash-based message authentication code (e.g., HMAC-512), RNG seeding, and/or any combination thereof may also reveal information to an attacker through a side channel attack.

Figure 2:
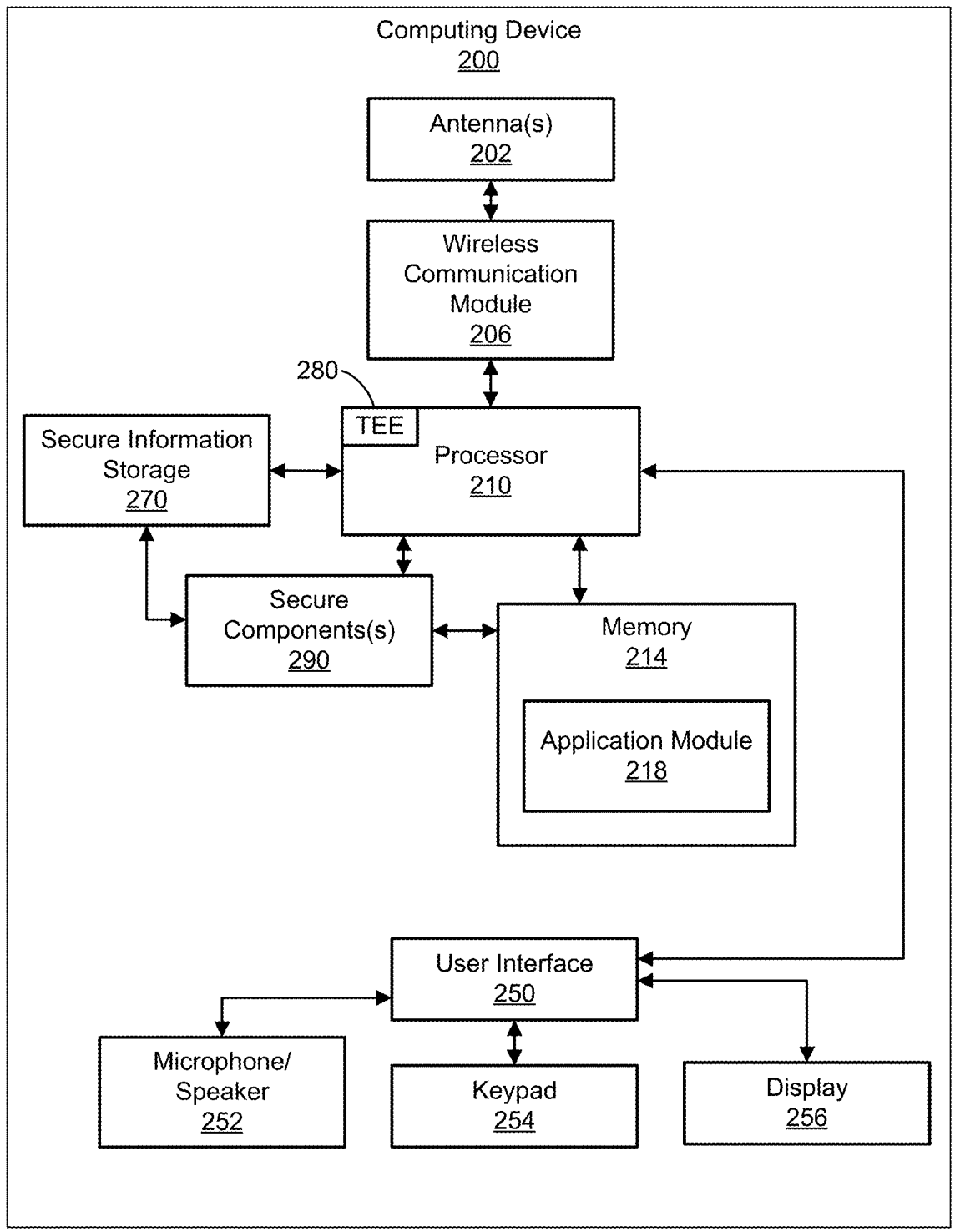
FIG. 2 is a block diagram illustrating an example of a computing device, in accordance with some examples of the present disclosure.

According to various examples, FIG. 2 is a diagram illustrating an example computing device 200. The computing device 200 may include, but is not limited to, any of the following: one or more processors (e.g., components that include integrated circuitry, memory, input and output device(s) (not shown), non-volatile storage hardware, one or more physical interfaces, any number of other hardware components (not shown), and/or any combination thereof. Examples of computing devices include, but are not limited to, a mobile device (e.g., laptop computer, smart phone, personal digital assistant, tablet computer, automobile computing system, and/or any other mobile computing device), an Internet of Things (IoT) device, a server (e.g., a blade-server in a blade-server chassis, a rack server in a rack, etc.), a desktop computer, a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a wearable device (e.g., a network-connected watch or smartwatch, or other wearable device), a robotic device, a smart television, a smart appliance, an extended reality (XR) device (e.g., augmented reality (AR), virtual reality (VR), etc.), any device that includes one or more SoCs, and/or any other type of computing device with the aforementioned requirements. In one or more examples, any or all of the aforementioned examples may be combined to create a system of such devices, which may collectively be referred to as a computing device. Other types of computing devices may be used without departing from the scope of examples described herein.

As illustrated in FIG. 2, the computing device 200 may include one or more antennas 202, one or more wireless communication modules 206, a processor 210, memory 214, application module 218, user interface 250, microphone/speaker 252, keypad 254, display 256, secure information storage 270, trusted execution environment 280, and secure components 290.

As shown, the computing device 200 may include one or more wireless communication modules 206 that may be connected to one or more antennas 202. The one or more wireless communication modules 206 comprise suitable devices, circuits, hardware, and/or software for communicating with and/or detecting signals to/from an access point, a network, a base station, and/or directly with other wireless devices within a network.

In some implementations, the one or more wireless communication modules 206 may comprise a communication system (e.g., a CDMA system) suitable for communicating with a network (e.g., a CDMA network) of wireless base stations. In some implementations, the wireless communication system may comprise other types of cellular telephony networks, such as, for example, TDMA, GSM, WCDMA, 4G/Long-Term Evolution (LTE), 5G/New Radio (NR), and the like. Additionally, any other type of wireless networking technologies may be used, including, for example, WiMax (802.16), Wi-Fi (802.11), and the like.

The processor(s) (also referred to as a controller) 210 may be connected to the one or more wireless communication modules 206. The processor 210 may include one or more microprocessors, microcontrollers, and/or digital signal processors that provide processing functions, as well as other calculation and control functionality. The processor 210 may be coupled to storage media (e.g., memory) 214 for storing data and software instructions for executing programmed functionality within the mobile device. The memory 214 may be on-board the processor 210 (e.g., within the same IC package), and/or the memory may be external memory to the processor and functionally coupled over a data bus.

A number of software engines and data tables may reside in memory 214 and may be utilized by the processor 210 in order to manage communications, perform positioning determination functionality, and/or perform device control functionality. In some cases, the memory 214 may include an application module 218. It is to be noted that the functionality of the modules and/or data structures may be combined, separated, and/or be structured in different ways depending upon the implementation of the computing device 200.

The application module 218 may include a process running on the processor 210 of the computing device 200, which may request data from one of the other modules of the computing device 200. Applications typically run within an upper layer of the software architectures and may be implemented in a rich execution environment of the computing device 200, and may include indoor navigation applications, shopping applications, financial services applications, social media applications, location aware service applications, etc.

In some examples, the computing device 200 includes the secure information storage 270. In some examples, the secure information storage 270 can be any storage device configured to store security information assets (e.g., cryptographic keys, metadata, etc.). For instance, the secure information storage 270 is where security information assets are stored and initially obtained from when needed for use on a computing device (e.g., for encryption and/or decryption of data). In some cases, the secure information storage 270 can include a key store or a key table. Examples of secure information storage 270 include, but are not limited to, various types of read-only memory, one-time programmable memory devices (e.g., one-time programmable fuses or other types of one-time programmable memory devices), non-volatile memory, etc. The secure information storage 270 may be operatively connected to the trusted execution environment 280 and/or the secure components 290. Although FIG. 2 shows the computing device 200 as including a single secure information storage 270, the computing device 200 may include any number of secure information storages without departing from the scope of examples described herein.

The processor 210 may include a trusted execution environment 280. The trusted execution environment 280 may also be referred to as a trusted management environment, trust zones, trusted platform modules, or the like. The trusted execution environment 280 can be implemented as a secure area of the processor 210 that can be used to process and store sensitive data in an environment that is segregated from the rich execution environment in which the operating system and/or applications (such as those of the application module 218) may be executed. The trusted execution environment 280 can be configured to execute secure applications (also referred to as trusted applications) that provide end-to-end security for sensitive data by enforcing confidentiality, integrity, and protection of the sensitive data stored therein. The trusted execution environment 280 can be used to store encryption keys, access tokens, and other sensitive data.

The computing device 200 may include one or more secure components 290. In some cases, the secure components 290 can be referred to as trusted components, secure elements, trusted elements, or the like. The computing device 200 may include the secure components 290 in addition to or instead of the trusted execution environment 280. The secure components 290 can comprise autonomous and tamper-resistant hardware that can be used to execute secure applications and the confidential data associated with such applications. The secure components 290 can be used to store encryption keys, access tokens, and other sensitive data. The secure components 290 can comprise a Near Field Communication (NFC) tag, a Subscriber Identity Module (SIM) card, or other type of hardware device that can be used to securely store data. The secure components 290 can be integrated with the hardware of the computing device 200 in a permanent or semi-permanent fashion or may, in some implementations, be a removable component of the computing device 200 that can be used to securely store data and/or provide a secure execution environment for applications.

Examples of secure applications that may be performed by the computing device 200, processor 210, secure information storage 270, trusted execution environment 280, secure components 290, and/or any combination thereof include, but are not limited to, encrypting data, decrypting data, key derivation, performing data integrity verification, and performing authenticated encryption and decryption. In some examples, the computing device 200 and/or portions thereof can be configured to perform the various cryptographic service types by being configured to execute one or more cryptographic algorithms. As an example, to perform encryption and decryption, one or more components (e.g., secure information storage 270, trusted execution environment 280, secure components 290) of the computing device 200 may be configured to execute one or more of the Advanced Encryption Standard XOR-encrypt-XOR Tweakable Block Ciphertext Stealing (AES-XTS) algorithm, the AES-Cipher Block Chaining (AES-CBC) algorithm, the AES-Electronic Codebook (AES-EBC) algorithm, the Encrypted Salt-Sector Initialization Vector-AES-CBC (ES-SIV-AES-CBC) algorithm, etc., including any variants of such algorithms (e.g., 128 bits, 192 bits, 256 bits, etc.). As another example, to perform integrity verification, one or more components of the computing device 200 may be configured to execute a hash algorithm such as, for example, the one or more members of the SHA family of hash algorithms. As another example, to perform authenticated encryption, one or more components of the computing device 200 may be configured to perform the AES-Galois/Counter Mode (GCM) algorithm. In some aspects, one or more components of the computing device 200 may be configured to execute any other cryptographic algorithms without departing from the scope of examples described herein.

The computing device 200 may further include a user interface 250 providing suitable interface systems, such as a microphone/speaker 252, a keypad 254, and/or a display 256 that allows user interaction with the computing device 200. The microphone/speaker 252 can provide for voice communication services (e.g., using the one or more wireless communication modules 206). The keypad 254 may comprise suitable buttons for user input. The display 256 may include a suitable display, such as, for example, a backlit LCD display, and may further include a touch screen display for additional user input modes.

While FIG. 2 shows a certain number of components in a particular configuration, one of ordinary skill in the art will appreciate that the computing device 200 may include more components or fewer components, and/or components arranged in any number of alternate configurations without departing from the scope of examples described herein. Additionally, although not shown in FIG. 2, one of ordinary skill in the art will appreciate that the computing device 200 may execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 2. The components shown in FIG. 2 may or may not be discrete components. In some aspects, one or more of the components can be combined into different hardware elements, implemented in software, and/or otherwise implemented using software and/or hardware. As used herein, the term device may be a discrete component or apparatus, or may not be a discrete component. In some aspects, other devices can exist within, be part of, and/or utilize the same hardware components as a device.

Figure 3A:
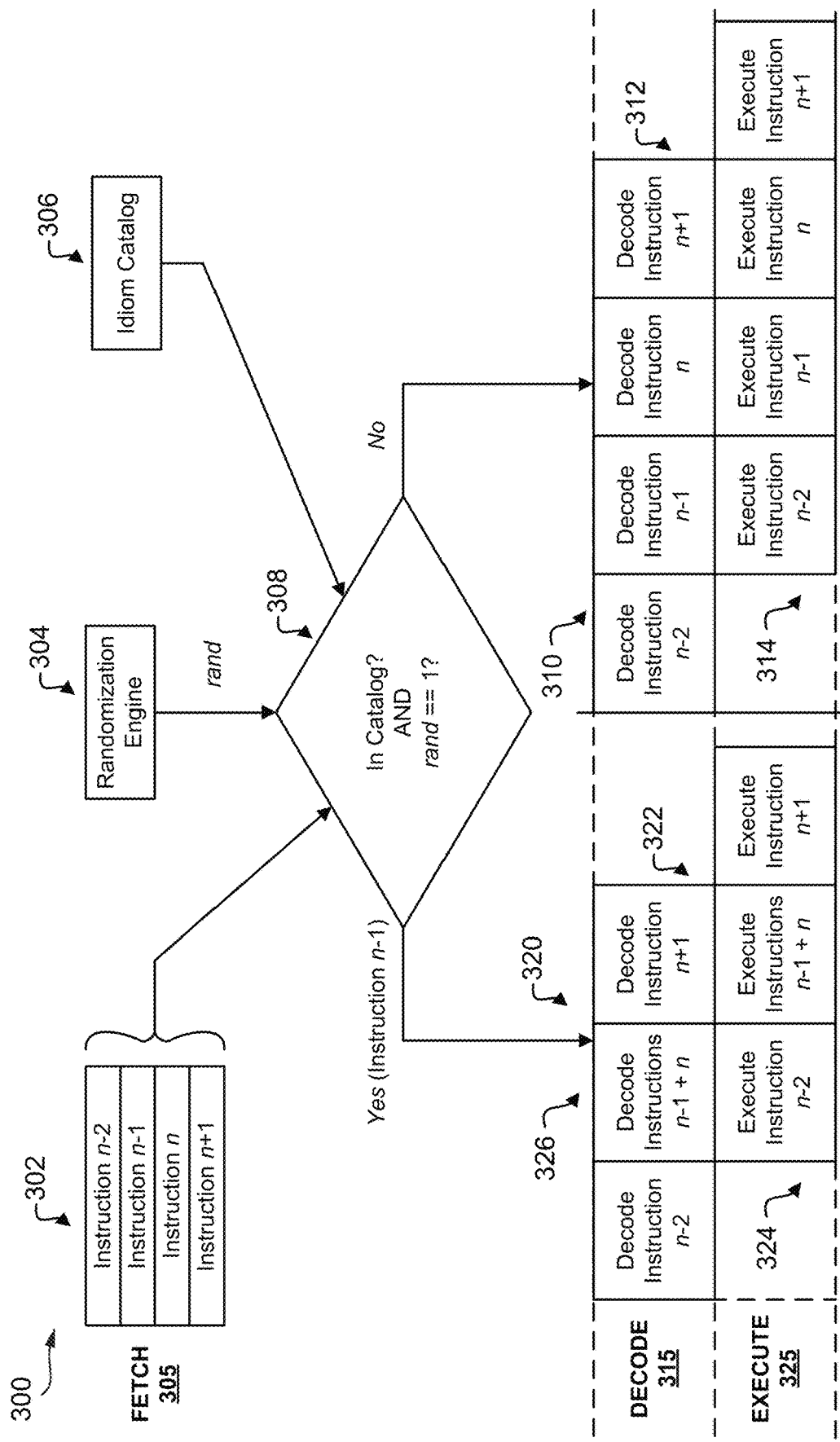
FIG. 3A is a block diagram illustrating an example instruction execution adjustment configuration, in accordance with some examples of the present disclosure.

FIG. 3A is a block diagram illustrating an example instruction execution adjustment configuration 300 for adjusting instruction execution. As illustrated, example instruction execution adjustment configuration 300 of FIG. 3A, can include a randomization engine 304 and an idiom catalog 306. In the illustrated example, four instructions 302 can be fetched during a fetch operation 305 of a processor (e.g., processor 210, trusted execution environment 280, and/or secure components 290 of FIG. 2, processor 810 of FIG. 8). In the illustrated example of FIG. 3A, an index n, where n is an integer, can represent an order of a sequence of operation cycles to be performed by the processor. For example, an operation with index n–2 can be performed immediately before an operation with index n−1 in a sequence of operations. In the illustrated example of FIG. 3A, the four instructions 302 fetched during fetch operation 305 can include instruction n−2, instruction n−1, instruction n, and instruction n+1. In some cases, the four instructions 302 can include ISA instructions of a processor.

In some examples, the randomization engine 304 can include a random number generator (RNG), a pseudorandom number generator (PRNG), or the like. In some cases, the randomization engine 304 can generate a random number that can be used to determine whether instructions compatible with fusion will be fused into a single operation or performed sequentially (e.g., in a sequence according to the index n). In the illustrated example, the random number output of the randomization engine 304 can be represented by the variable rand.

In some implementations, the idiom catalog 306 can include instructions that are candidates for fusion. FIG. 3B is a diagram of an example idiom catalog 350 that provides an illustrative example of an idiom catalog that may be used by the instruction execution adjustment configuration 300 of FIG. 3A. In the illustration of FIG. 3B, the idiom catalog 350 includes a list of idioms 352 and corresponding instruction fusion candidate operations 354. For example, row 362 of the idiom catalog 350 includes an idiom for indexed loads. As illustrated, the idiom for indexed loads can correspond to an add operation followed by an ld (load) operation. In another example, row 364 of the idiom catalog 350 includes an idiom for a load pair. As illustrated the idiom for a load pair can correspond to two consecutive ld (load) operations. In another example, row 366 of the idiom catalog 350 includes an idiom for a store pair. As illustrated, the idiom for a store pair can correspond to two consecutive st (store) operations. Although the example idiom catalog 350 of FIG. 3B provides examples of idioms corresponding to pairs of instructions, in some cases, idioms corresponding to three or more instructions may be used without departing from the scope of the present disclosure.

Returning to FIG. 3A, the four instructions 302, the variable rand output by the randomization engine 304, and the idiom catalog 306 can be input into an instruction fusion decision engine 308.

In some implementations, the instruction fusion decision engine 308 can determine whether the four instructions 302 include satisfy one or more instruction fusion conditions. As used herein, simultaneously executing two ISA instructions refers to executing a first instruction of the two ISA instructions with a first subset of the hardware resources available to a processor and executing a second instruction of the two ISA instructions with a second subset of the hardware resources available to the processor, different from the first subset of hardware resources available to the processor, for at least one clock cycle. herein, instruction fusion conditions refer to conditions used to determine whether two or more instructions will be fused. For example, a first instruction fusion condition (also referred to as a first condition herein) can included determining whether two or more sequential instructions that correspond to one of the idioms in the list of idioms 352 of the idiom catalog 350. For example, for a first instruction (e.g., instruction n−2) of the four instructions 302, the instruction fusion decision engine 308 can determine whether one or more instructions following the first instruction is included in the idiom catalog 306. In some cases, if the instruction fusion decision engine 308 determines that first instruction and one or more instructions following the first instruction is included in the idiom catalog, the instruction fusion decision engine 308 can determine that a first condition (e.g., "In Catalog?") is true for the first instruction. However, if the instruction fusion decision engine 308 determines that the first instruction followed by the second instruction (e.g., instruction n−1) is not part of any idiom of the idiom catalog 306, then the instruction fusion decision engine 308 can determine that the first condition is false for the first instruction. In some cases, the instruction fusion decision engine 308 may not determine the first condition for the final instruction (e.g., the instruction n+1) obtained during the fetch operation 305 which the instruction fusion decision engine 308 may lack adequate information (e.g., instruction n+2) to determine whether the final instruction is part of an idiom in the idiom catalog 306.

In some implementations, for a combination of instructions for which the instruction fusion decision engine 308 determines that the first condition is true, the instruction fusion decision engine 308 can obtain a random value for the variable rand. In the illustrated example, rand, can be a binary number that can have a value of zero (0) (e.g., logical FALSE) or one (1) (e.g., logical TRUE). In some aspects, if the instruction fusion decision engine 308 determines that the value of rand for a particular combination of instructions in the catalog is equal to one (e.g., rand==1), then the instruction fusion decision engine 308 can determine that a second instruction fusion condition (also referred to as a second condition herein) is true. However, if the instruction fusion decision engine 308 determines that the value of rand for a particular combination of instructions in the catalog is equal to zero (e.g., rand==0), then the instruction fusion decision engine 308 can determine that the second condition is false.

In some cases, the instruction fusion decision engine 308 can repeat the process of determining whether the first condition is true for each of the four instructions 302. In some cases, for each instruction of the four instructions 302 for which the first condition is true, the instruction fusion decision engine 308 can determine whether the second condition is true.

However, in some cases, once two or more instructions are fused into a single fused instruction, the instruction fusion decision engine 308 can be excluded from consideration for fusion. In some cases, the instruction fusion decision engine 308 can bypass checking whether the first condition is true for the instructions included in the single fused instruction that were not previously checked. In one illustrative example, if the instruction fusion decision engine 308 that the first condition is true for first instruction followed by the second instruction and that the second condition is true for the first instruction followed by the second instruction, the fusion decision engine 308 can combine the first instruction and the second instruction into a single fused instruction. In some examples, upon combining the first and second instruction into a single fused instruction, the instruction fusion decision engine 308 may bypass checking whether the first condition is true for the second instruction.

In the illustrative example of FIG. 3A, two different sequences of decode operations 315 and execute operations 325 are illustrated. In some cases, the two different sequences of decode operations 315 can include determining which hardware resources (e.g., arithmetic logic units (ALUs), load/store units (LSUs), memory controllers, branch units, registers, or the like) of a processor will be used for execution of an instruction and/or retrieving operands for the instruction to be executed. In some aspects, the execute operations 325 can include performing the decoded instructions using the computation modules and/or any retrieved operands.

In the first illustrated sequence 310 (as indicated by the arrow labeled "no," a sequence of decode operations 312 and execute operations 314 is illustrated for a case where the instruction fusion decision engine 308 determines that none of the four instructions 302 satisfy both the first condition and the second condition. In some cases, the first illustrated sequence 310 can correspond to cases where the four instructions 302 do not include any idioms. In some examples, the first illustrated sequence 310 can correspond to cases where one or more of the four instructions 302 include idioms, but for each event that two or more instructions correspond to an idiom in the catalog, the value or rand obtained by the instruction fusion decision engine 308 was zero (0). As illustrated in the first illustrated sequence 310, decode operations for each of the four instructions 302 (e.g., instruction n−2, instruction n−1, instruction n, and instruction n+1) can be performed sequentially. In the illustrated example, execution of the instructions can follow decoding of the corresponding instruction by a single cycle. For example, instruction n−2 can be executed during the decoding of instruction n−1, instruction n−1 can be executed during the decoding of instruction n, and so on. Accordingly, in the illustrated example of FIG. 3A, execution of instruction n+1 can occur four cycles after decoding of instruction n−2.

In the second illustrated sequence 320, a sequence of decode operations 322 and a sequence of execution operations 324 are illustrated for a case where the instruction fusion decision engine 308 determines that the first condition (e.g., inclusion in the idiom catalog 306) and the second condition (e.g., rand is equal to one (1)) are true for a particular instruction (e.g., instruction n−1). In the illustrated example, execution of the instructions can follow decoding of the corresponding instruction by a single cycle. However, as illustrated, instruction n−1 and instruction n can be fused into a single decode operation 326 and a single execute operation 328. In the sequence of decode operations 322, the instruction fusion decision engine 308 can decode the instruction n−2 during a first decode cycle, then decode a fused instruction including instruction n−1 and instruction n during a second decode cycle, and finally decode instruction n+1 during a third decode cycle. Similarly, in the sequence of execution operations 324, the instruction fusion decision engine 308 can execute the instruction n−2 during a first decode cycle, then execute the fused instruction including instruction n−1 and instruction n during a second execute cycle, and finally decode instruction n+1 during a third execute cycle. In the illustrated example, the instruction fusion decision engine 308 can execute the instruction n−2 during the same cycle as decoding instruction n−1 and instruction n. As shown, the instruction fusion decision engine 308 can execute the fused instruction including instruction n−1 and instruction n while decoding instruction n+1. As illustrated for the sequence of execution operations 324, execution of instruction n+1 can occur three cycles after decoding of instruction n−2. In the example of FIG. 3A, first illustrated sequence 310 and second illustrated sequence 320 demonstrate how fusing of instructions can result in variations in the timing of operations, which can confuse attackers attempting to perform side channel attacks and/or fault injection attacks. In some implementations, executing instruction n−1 and instruction n as a single fused instruction can reduce the total number of instructions executed by the processor. For example, the second illustrated sequence 320 includes three execute cycles while the first illustrated sequence 310 includes four execute cycles. Accordingly, instruction fusion can reduce a total number of operations performed by a processor while also enhancing security.

Although the example of FIG. 3A illustrates use of the instruction execution adjustment configuration 300 for instruction fusion, in some cases, the instruction execution adjustment configuration 300 can additionally or alternatively be utilized to perform other types of instruction execution adjustments. For example, in some cases, the instruction execution adjustment configuration 300 can be utilized to perform fission of instructions. In some implementations, performing fission of instructions can be suitable in the context of an ISA of a complex instruction set computer (CISC). In some cases, the ISA of a CISC processor may include ISA instructions that combine the functionality of two or more other ISA instructions. In one illustrative example, an ISA instruction may include two or more operations (e.g., add and multiply instruction) to be performed in a single cycle of a processor that could also be executed as two or more ISA instructions (e.g., add instruction, multiply instruction) during sequential cycles to produce different execution timing.

Figure 3C:
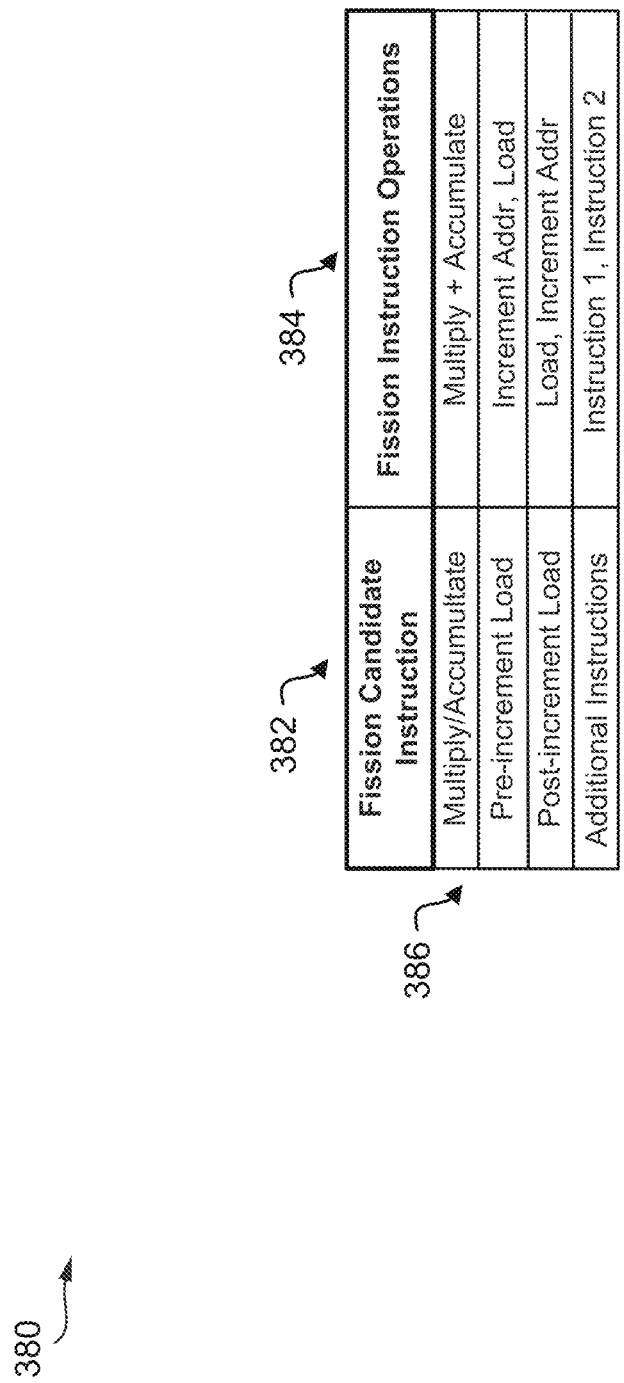
FIG. 3C is a diagram of an additional example idiom catalog, in accordance with some examples of the present disclosure.

Referring to FIG. 3C, a fission catalog 380 can include a list of fission candidate instructions 382 and corresponding fission instruction operations. For example, a first fission candidate instruction 386 can be a multiply/accumulate operation and the corresponding fission instruction operations can be a multiply operation and a separate accumulate operation. Additional example fission candidate instructions 382 can include, without limitation, pre-increment load, post-increment load, pre-decrement load, post-decrement load, pre-increment store, post-increment store, pre-decrement store, or post-decrement store.

Returning to FIG. 3A, the instruction execution adjustment configuration 300 can determine whether each instruction in the four instructions 302 fetched during the fetch operation 305 is included in the list of fission candidate instructions 382 of idiom catalog 380 of FIG. 3C. In some examples, if the instruction execution adjustment configuration 300 determines that an instruction is included in the list of fission candidate instructions 382 of idiom catalog 380, the instruction execution adjustment configuration 300 can determine that the first condition (e.g., "In Catalog?") is true. In some cases, for each instruction of the four instructions 302 determined to be in the catalog, the instruction execution adjustment configuration 300 can obtain a value of the random variable rand from the randomization engine 304. If the value of the random variable rand for an instruction included in the catalog is equal to one (1), the instruction execution adjustment configuration 300 can determine that a second condition is true (e.g., rand==1). In some cases, if the first condition and the second condition are true for an instruction, the instruction execution adjustment configuration 300 can decode and/or execute the fission instruction operations 384 corresponding to the fission candidate instruction 382 sequentially.

Figure 4:
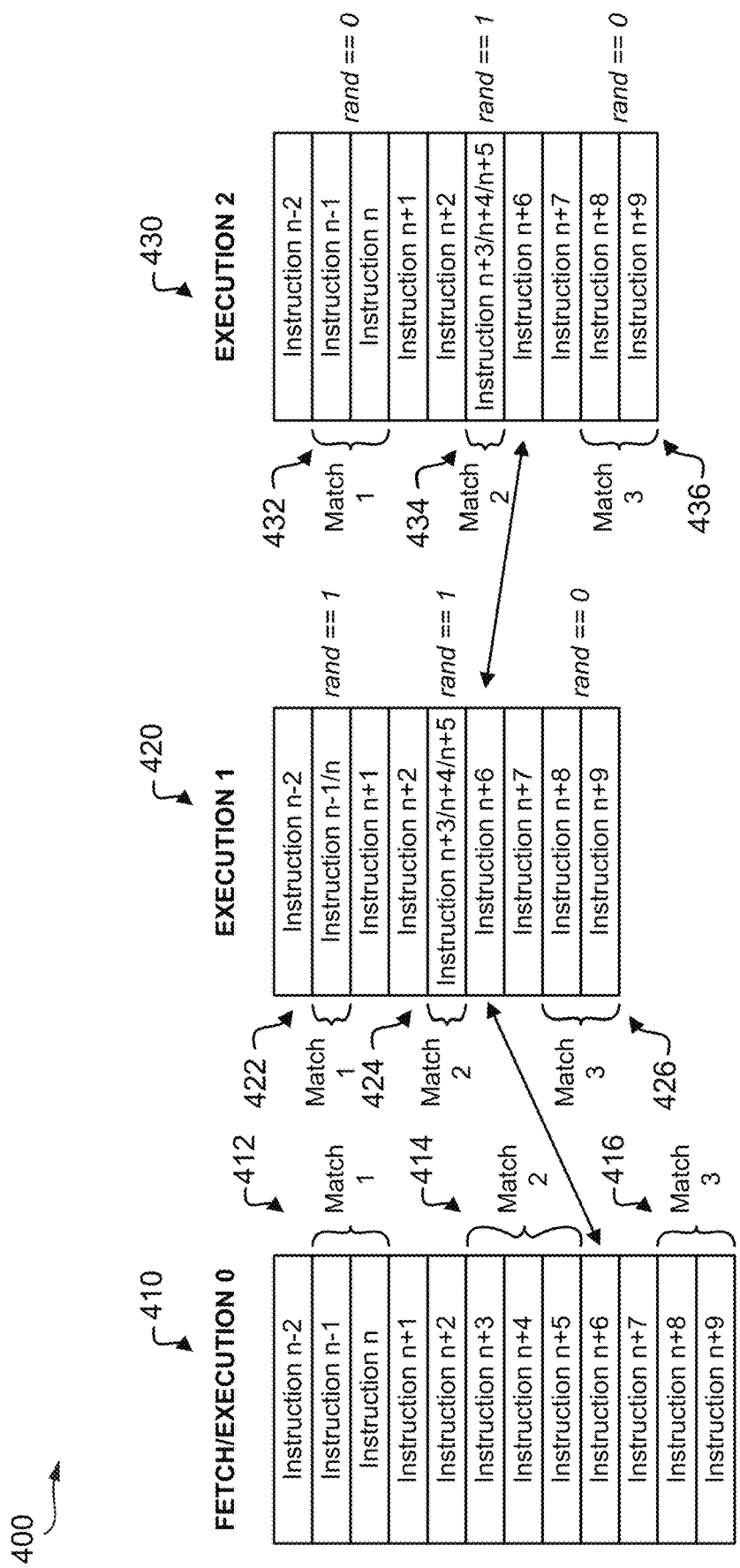
FIG. 4 is a diagram illustrating examples of instruction execution of an identical sequence of instructions with different numbers of instruction execution cycles, in accordance with some examples of the present disclosure.

FIG. 4 is a diagram 400 illustrating examples of instruction execution of an identical sequence of instructions with different numbers of instruction execution cycles. In the illustrated example of FIG. 4, a sequence of twelve instructions 410 beginning with an instruction n−2 and ending with an instruction n+9 are illustrated. In some cases, the sequence of instructions 410 can represent the order of instructions obtained during one or more fetch operations of a processor. For example, the sequence instructions 410 can include three sets of four instructions (e.g., four instructions 302 of FIG. 3A) obtained during three consecutive fetch operations. In the illustrated example of FIG. 4, three different groups of consecutive instructions match with idioms included in an idiom catalog (e.g., idiom catalog 306 of FIG. 3A, idiom catalog 350 of FIG. 3B). As illustrated, a sequence of instruction n−1 followed by instruction n corresponds to a first idiom and is labeled as Match 1. As another example, a sequence of instruction n+3 followed by instruction n+4 and further followed by instruction n+5 corresponds to a second idiom and is labeled as Match 2. In one additional example, a sequence of instruction n+8 followed by instruction n+8 corresponds to a third idiom and is labeled as Match 3.

In some cases, the sequence of twelve instructions 410 can also correspond to a sequence of decoding and/or executing the sequence of twelve instructions 410. For example sequence of twelve instructions 410 can correspond to the sequence of decoding and/or executing the twelve instructions where none of the instructions is included in a fused instruction (e.g., first illustrated sequence 310 of FIG. 3A). For example, if the value of variable rand is equal to zero (e.g., rand==0) for each of Match 0, Match 1, and Match 2, the sequence of twelve instructions 410 can correspond to the sequence for decoding and/or executing the twelve instructions. Accordingly, sequence of twelve instructions 410 can including sequential execution 412 of the corresponding to the first idiom, sequential execution 414 of the instructions corresponding to the second idiom, and sequential execution 416 of the instructions corresponding to the third idiom.

In the illustrative example of FIG. 4, a second sequence of instructions 420 can represent an execution order for executing the fetch sequence of twelve instructions 410 with fusion 422 of the instructions corresponding to the first idiom, fusion 424 of the instructions corresponding to the second idiom, and sequential execution 426 of the instructions corresponding to the third idiom. In some cases, the second sequence of instructions 420 can correspond to a value of rand equal to one (e.g., rand==1) for the instructions corresponding to the first idiom and the second idiom and value of rand equal to zero (e.g., rand==0) for the instructions corresponding to the third idiom.

As illustrated, a third sequence of instructions 430 can represent an execution order for executing the fetch sequence of twelve instructions 410 with sequential execution 432 of the instructions corresponding to the first idiom, fusion 434 of the instructions corresponding to the second idiom, and sequential execution 436 of the instructions corresponding to the third idiom. In some cases, the third sequence of instructions 430 can correspond to a value of rand equal to one (e.g., rand==1) for the instructions corresponding to the and the second idiom and value of rand equal to zero (e.g., rand==0) for the instructions corresponding to the first idiom and the third idiom.

In the illustrated example of FIG. 4, arrows between the sequence of twelve instructions 410, second sequence of instructions 420, and third sequence of instructions 430 are provided to highlight differences in execution timing of the instruction n+6. Although not highlighted, the first, second, and third sequences of instructions 410, 420, 430 can also result in different execution timing of other instructions as illustrated in FIG. 4.

Figure 5A:
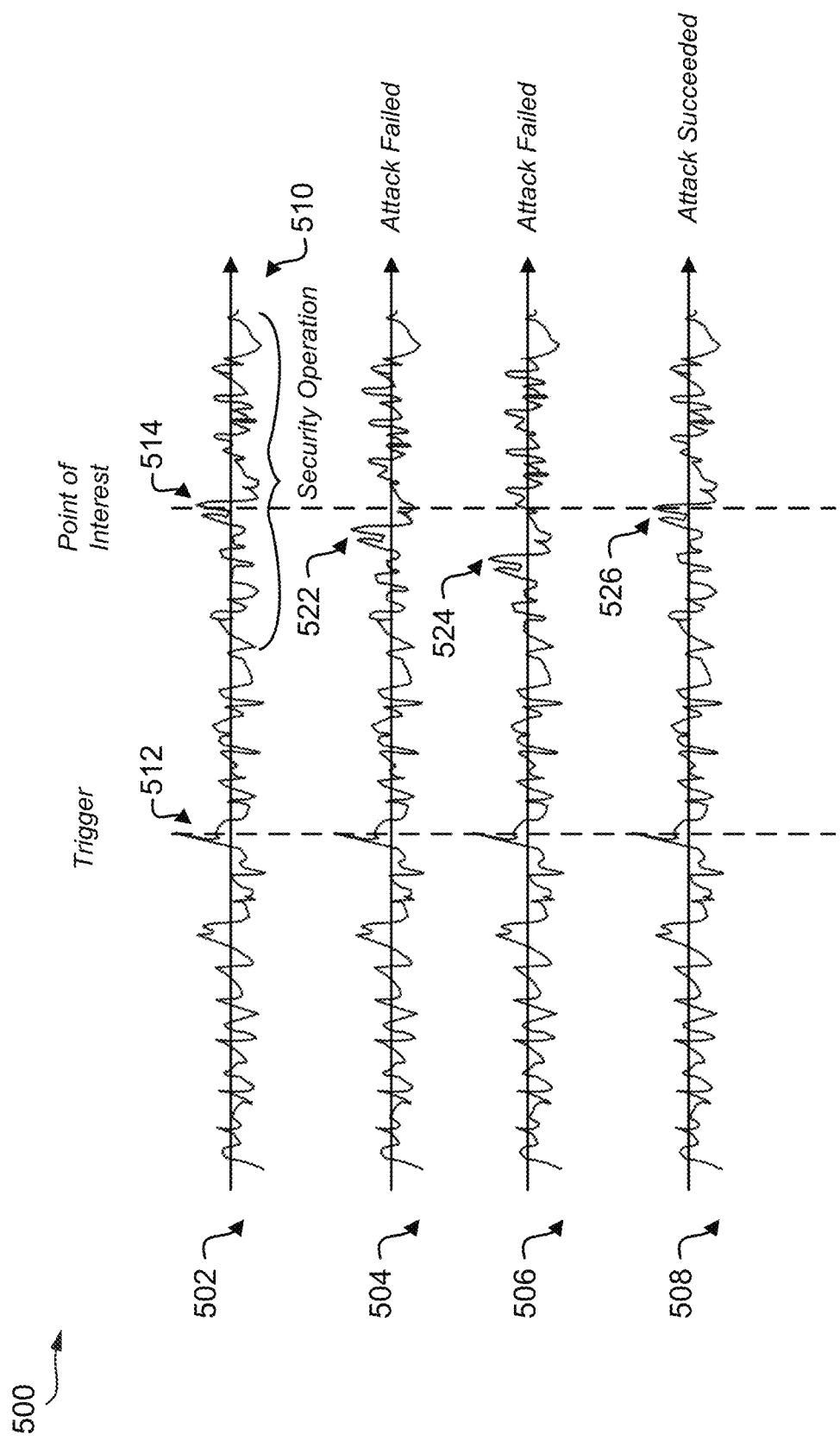
FIG. 5A is a diagram illustrating waveforms illustrating an example impact of varying instruction execution on a fault injection attack, in accordance with some examples of the present disclosure.

FIG. 5A is a diagram 500 illustrating waveforms illustrating an example impact of varying instruction execution on a fault injection attack. In the illustrated example of FIG. 5A, a first waveform 502 illustrates relative timing for a trigger 512 and a point of interest 514 within execution of a security operation 510. For example, the point of interest 514 can represent a timing for performing a fault injection (e.g., a laser fault injection) to achieve a desired result (e.g., bypassing an authentication operation). In the illustrated example of FIG. 5A, the timing of the trigger 512 is aligned for all of the waveforms 502, 504, 506, 508.

As illustrated, waveform 504 illustrates execution of an instruction with adjusted execution where a peak 522 in the waveform 504 corresponds to the point of interest 514 of waveform 502 but occurs with a different time offset relative to the trigger 512. Similarly, waveform 506 illustrates execution of an instruction with adjusted execution where a peak 524 corresponds to the point of interest 514 of waveform 502 but occurs with a different time offset relative to the trigger 512. However, waveform 508 illustrates execution of an instruction with adjusted execution where a peak 526 corresponding to the point of interest 514 of waveform 502 occurs at an identical time offset relative to the trigger 512. In some cases, the difference in timing of trigger 512 relative to point of interest 514, peak 522, peak 524, and peak 526 can be based on instruction fusion and/or fission (e.g., by an instruction execution adjustment configuration 300 of FIG. 3A), resulting in different instruction execution timing.

Figure 5B:
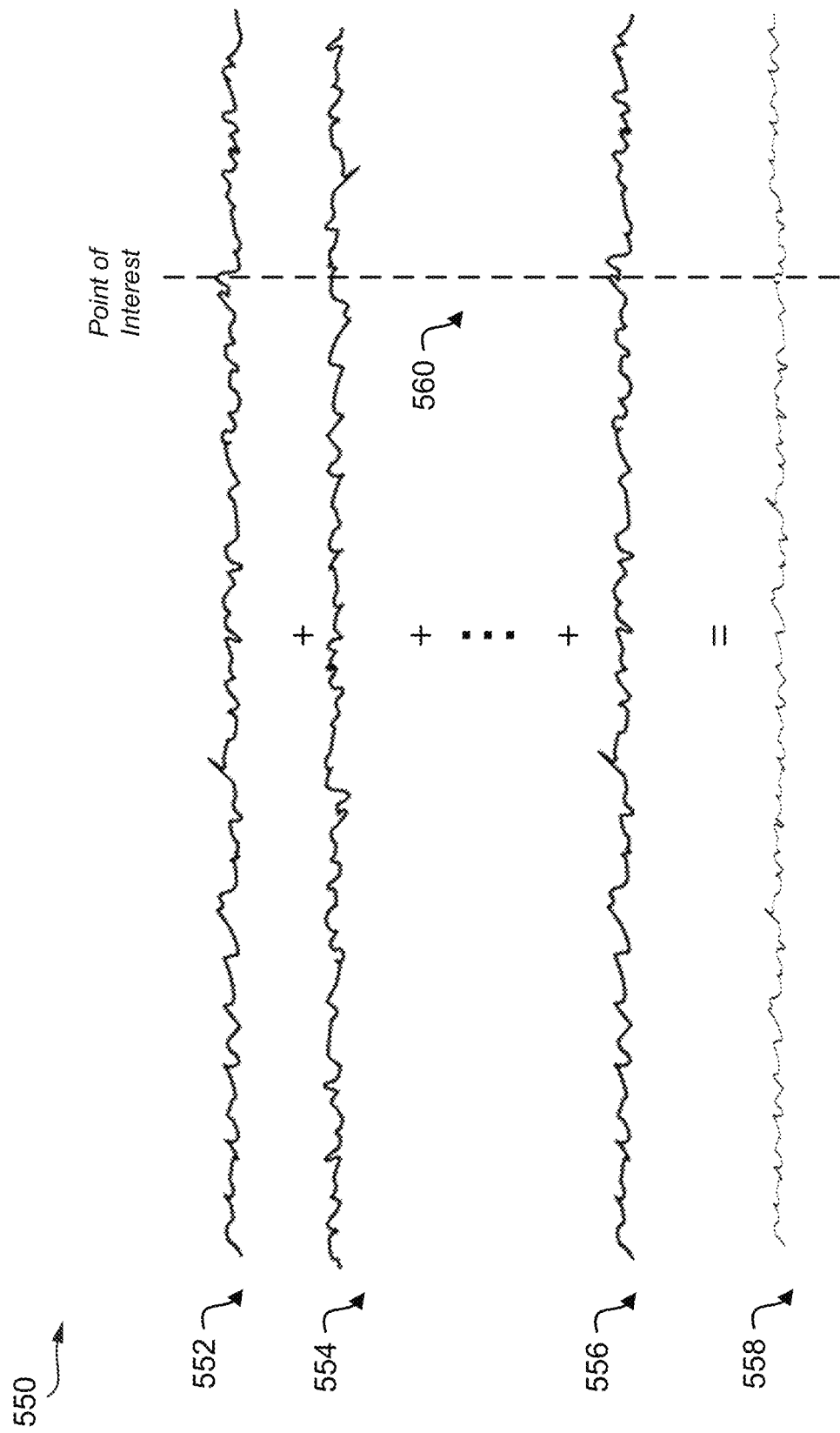
FIG. 5B is a diagram including waveforms illustrating an example impact of varying instruction execution on a side channel attack, in accordance with some examples of the present disclosure.

FIG. 5B is a diagram 550 including waveforms illustrating an example impact of varying instruction execution on a side channel attack. In the illustrated example of FIG. 5B, waveform 552 illustrates execution of an operation that may include a point of interest 560 that may be targeted by an attacker in a side channel attack. As illustrated, waveform 554 and waveform 556 illustrate execution of the same operation as illustrated in waveform 502 with one or more instruction execution adjustments (e.g., by instruction execution adjustment configuration 300 of FIG. 3A) that differ from the instruction execution illustrated in waveform 502. In some cases, an attacker may utilize averaging of an operation that is performed repeatedly to improve signal-to-noise ratio (SNR) of the point of interest 560. However, as illustrated in FIG. 5B, the sum 558 of waveforms 552, 554, 556 and multiple other repetitions of the same operation with varying instruction execution can average out to have the appearance of noise and/or to otherwise appear to belong to a different instruction from the waveform 552. In some cases, the average of the waveforms 552, 554, 556, and other repetitions of the same operation can be determined by dividing the sum 558 of the waveforms by the total number of waveforms. As illustrated in FIG. 5B, the use of different instruction execution based on instruction execution adjustment can prevent an attacker from successfully performing a side channel attack.

Figure 6A:
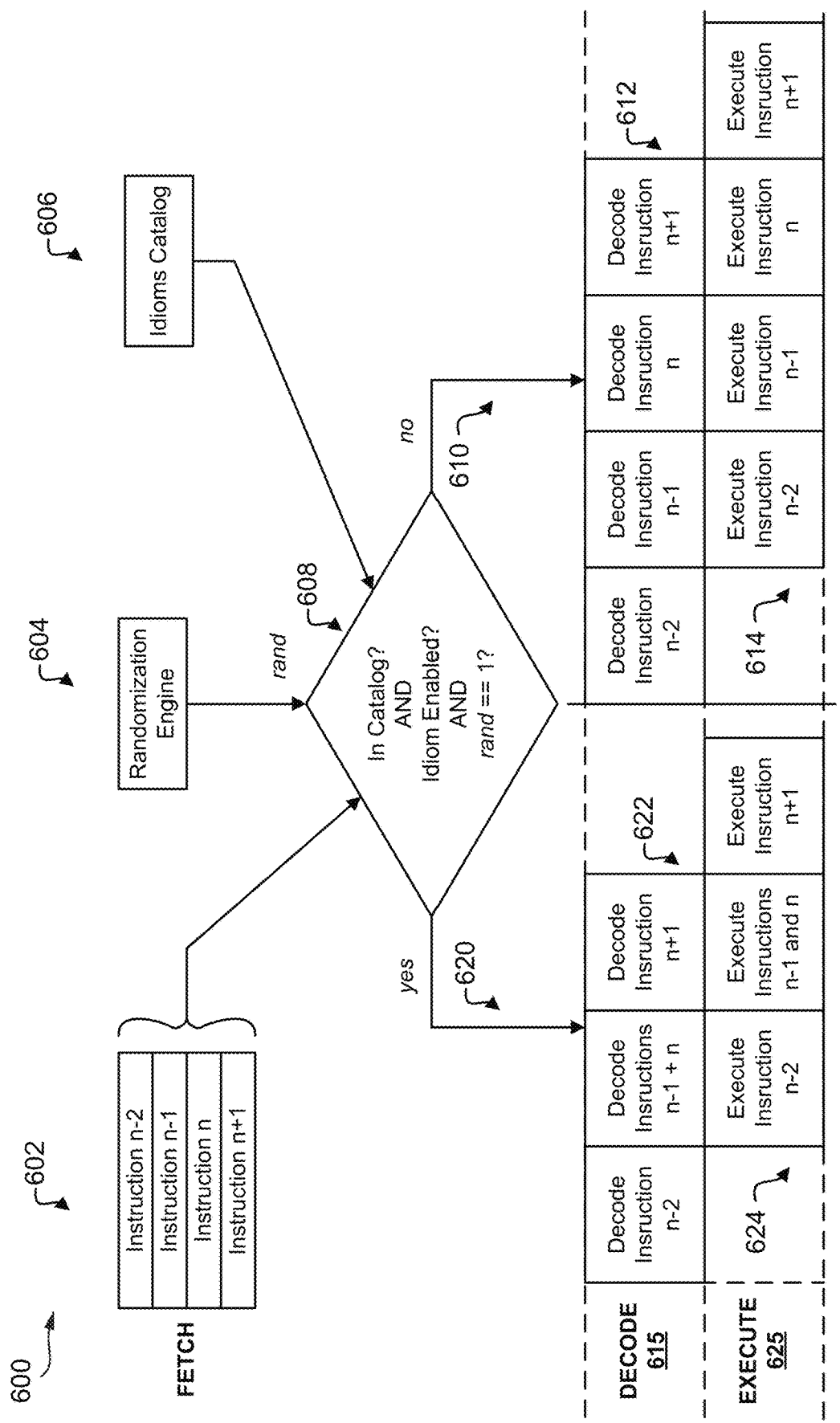
FIG. 6A is a block diagram illustrating an additional example instruction execution adjustment configuration, in accordance with some examples of the present disclosure.

FIG. 6A is a block diagram illustrating an additional example instruction execution adjustment configuration 600. In the example of FIG. 6A, the four instructions 602 can correspond to four instructions 302 of FIG. 3A and the randomization engine 604 can correspond to randomization engine 304 of FIG. 3A, the first illustrated sequence 610 can correspond to first illustrated sequence 310 of FIG. 3A, the sequence of decode operations 612 can correspond to sequence of decode operations 312 of FIG. 3A, the operations 614 can correspond to operations 314 of FIG. 3A, the second illustrated sequence 620 can correspond to second illustrated sequence 320 of FIG. 3A, sequence of decode operations 622 can correspond to sequence of decode operations 322 of FIG. 3A, and sequence of execution operations 624 can correspond to sequence of execution operations 324 of FIG. 3A.

Referring to FIG. 6B, the idiom catalog 650 can correspond to the idiom catalog 606 of FIG. 6A. In the illustrated example of FIG. 6B, the list of idioms 652 can correspond to list of idioms 352 of FIG. 3B and the corresponding instruction fusion candidate operations 654 can correspond to corresponding instruction fusion candidate operations 354 of FIG. 3B. In the illustrated example of FIG. 6B, the idiom catalog 650 can include an additional idiom enable value 656 corresponding to each of the idioms 652.

In the illustrated example, the instruction fusion decision engine 608 can used to determine a first condition (e.g., "In Catalog?") is true and whether a second condition (e.g., rand==1) is true similar to the instruction fusion decision engine 308 of FIG. 3A. However, as illustrated in FIG. 6A, the instruction fusion decision engine 608 may also be configured to determine whether a third fusion condition (e.g., "Idiom Enabled?") is true. As used herein, the third fusion condition is also referred to as a third condition. For example, if the additional example instruction execution adjustment configuration 600 determines that the idiom enable value 656 corresponding to an idiom 652 in the idiom catalog 650 is equal to one (1), then the additional example instruction execution adjustment configuration 600 can determine that the third condition is true. In some cases, the idiom enable values 656 can be determined at runtime to introduce further diversification between several executions of a particular operation of interest (e.g., a security operation). In some cases, if the additional example instruction execution adjustment configuration 600 determines that the first condition, the second condition, and the third condition are true, the additional example instruction execution adjustment configuration 600 can replace instructions included in an idiom of the idiom catalog 606 with the corresponding instruction fusion candidate operations 654 included in the idiom catalog 606. In some cases, decode operations 615 and/or execute operations 625 can be adjusted by the additional example instruction execution adjustment configuration 600 in a similar manner to the instruction execution adjustments (e.g., fusion and/or fission) described with respect to instruction execution adjustment configuration 300 of FIG. 3A, idiom catalog 350 of FIG. 3B, and/or idiom catalog 380 of FIG. 3C.

Figure 7:
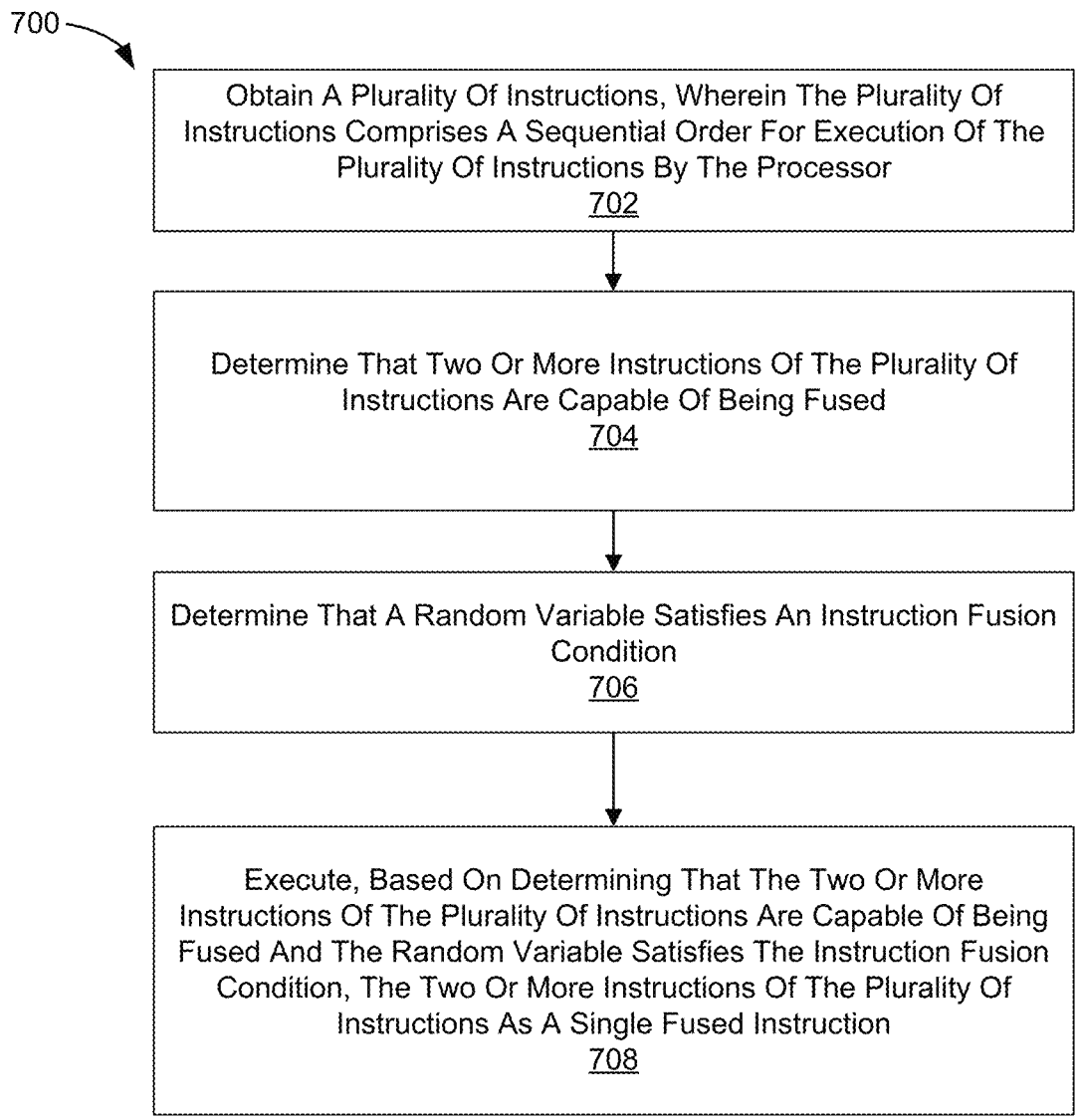
FIG. 7 is a flow diagram illustrating an example of a process for adjusting instruction execution, in accordance with some examples of the present disclosure.

FIG. 7 is a flow diagram illustrating an example of a process 700 of wireless communication. The process 700 and/or other process described herein can be performed by a computing device (or apparatus) or a component (e.g., a chipset, codec, etc.) of the computing device. The computing device may be an extended reality (XR) device (e.g., a virtual reality (VR) device or augmented reality (AR) device), a mobile device (e.g., a mobile phone), a network-connected wearable such as a watch, a vehicle or component or system of a vehicle, or other type of computing device. In one example, the process 700 and/or other process described herein can be performed by the computing device 200 of FIG. 2. In another example, one or more of the processes can be performed by the computing system 800 shown in FIG. 8. For instance, a computing device with the computing system 800 shown in FIG. 8 can include the components of computing device 200 of FIG. 2 and/or can implement the operations of the process 700 of FIG. 7 and/or other process described herein. The operations of the process 700 may be implemented as software components that are executed and run on one or more processors (e.g., the processor 810 of FIG. 8, a processor such as a DSP, GPU, NPU, etc., or other processor(s)). Further, the transmission and reception of signals by the computing device in the process 700 may be enabled, for example, by one or more antennas, one or more transceivers (e.g., wireless transceiver(s)), and/or other communication components of the computing device (e.g., the communication interface 840 of FIG. 8).

At block 702, the computing device (or component thereof) can obtain a plurality of instructions. In some aspects, the plurality of instructions comprises a sequential order for execution (e.g., sequence of execution operations 314 of FIG. 3A, sequence of execution operations 614 of FIG. 6A) of the plurality of instructions by a processor (e.g., processor 210, trusted execution environment 280, secure components 290 of FIG. 2). In some aspects, each instruction of the plurality of instructions is included in an ISA of the processor.

At block 704, the computing device (or component thereof) can determine (e.g., by instruction fusion decision engine 308 of FIG. 3A, instruction fusion decision engine 608 of FIG. 6A) that two or more instructions of the plurality of instructions are capable of being fused (e.g., correspond to an idiom in the idiom catalog 350 of FIG. 3B).

At block 706, the computing device (or component thereof) can determine that a random variable satisfies an instruction fusion condition. In some aspects, determining that the random variable satisfies the instruction fusion condition includes determining that the random variable has a value of one (1) or TRUE.

At block 708, the computing device (or component thereof) can execute, based on determining that the two or more instructions of the plurality of instructions are capable of being fused and the random variable satisfies the instruction fusion condition, the two or more instructions of the plurality of instructions as a single fused instruction (e.g., single execute operation 328 of FIG. 3A). In some cases, the processor is configured to simultaneously execute the two or more instructions. In some examples, executing the two or more instructions as the single fused instruction reduces a total number of operations performed by the processor relative to performing the two or more instructions of the plurality of instructions sequentially.

In some aspects, the two or more instructions of the plurality of instructions include two instructions. In some cases, executing the two or more instructions of the plurality of instructions as the single fused instruction includes combining the two instructions into a single instruction. In some aspects, the two instructions are simultaneously executed by different hardware components of the processor.

In some examples, an idiom catalog (e.g., idiom catalog 350 of FIG. 3B) comprises a plurality of idioms. In some cases, each idiom of the plurality of idioms comprises a sequence of two or more instructions capable of fusion and a respective fused instruction corresponding to the sequence of two or more instructions capable of fusion.

In some cases, the computing device (or component thereof) can determine that a first additional instruction of the plurality of instructions is not capable of fusion with a second additional instruction of the plurality of instructions. In some examples, the second additional instruction of the plurality of instructions immediately follows the first additional instruction of the plurality of instructions in the sequential order for execution of the plurality of instructions by the processor. In some examples, the computing device (or component thereof) can execute, based on determining that the first additional instruction of the plurality of instructions is not capable of fusion with the second additional instruction of the plurality of instructions, the first additional instruction sequentially after execution of the single fused instruction.

In some implementations, the computing device (or component thereof) can determine that a first additional instruction of the plurality of instructions is capable of fusion with a second additional instruction of the plurality of instructions. In some cases, the second additional instruction of the plurality of instructions immediately follows the first additional instruction of the plurality of instructions in the sequential order for execution of the plurality of instructions by the processor. In some examples, the computing device (or component thereof) can determine that a second random variable does not satisfy a second instruction fusion condition. In some aspects, the computing device (or component thereof) can execute, based on determining that the second random variable does not satisfy the second instruction fusion condition, the first additional instruction of the plurality of instructions sequentially after execution of the single fused instruction. In some implementations, the computing device (or component thereof) can execute the second additional instruction of the plurality of instructions sequentially after execution of the first additional instruction of the plurality of instructions. In some aspects, to determine that the second random variable does not satisfy the second instruction fusion condition, the processor can determine that the random variable has a value of zero (0) or FALSE.

In some examples, the processes described herein (e.g., process 700 and/or other process described herein) may be performed by a computing device or apparatus (e.g., a computing device 200). In another example, the process 700 may be performed by a computing device with the computing system 800 shown in FIG. 8.

Figure 8:
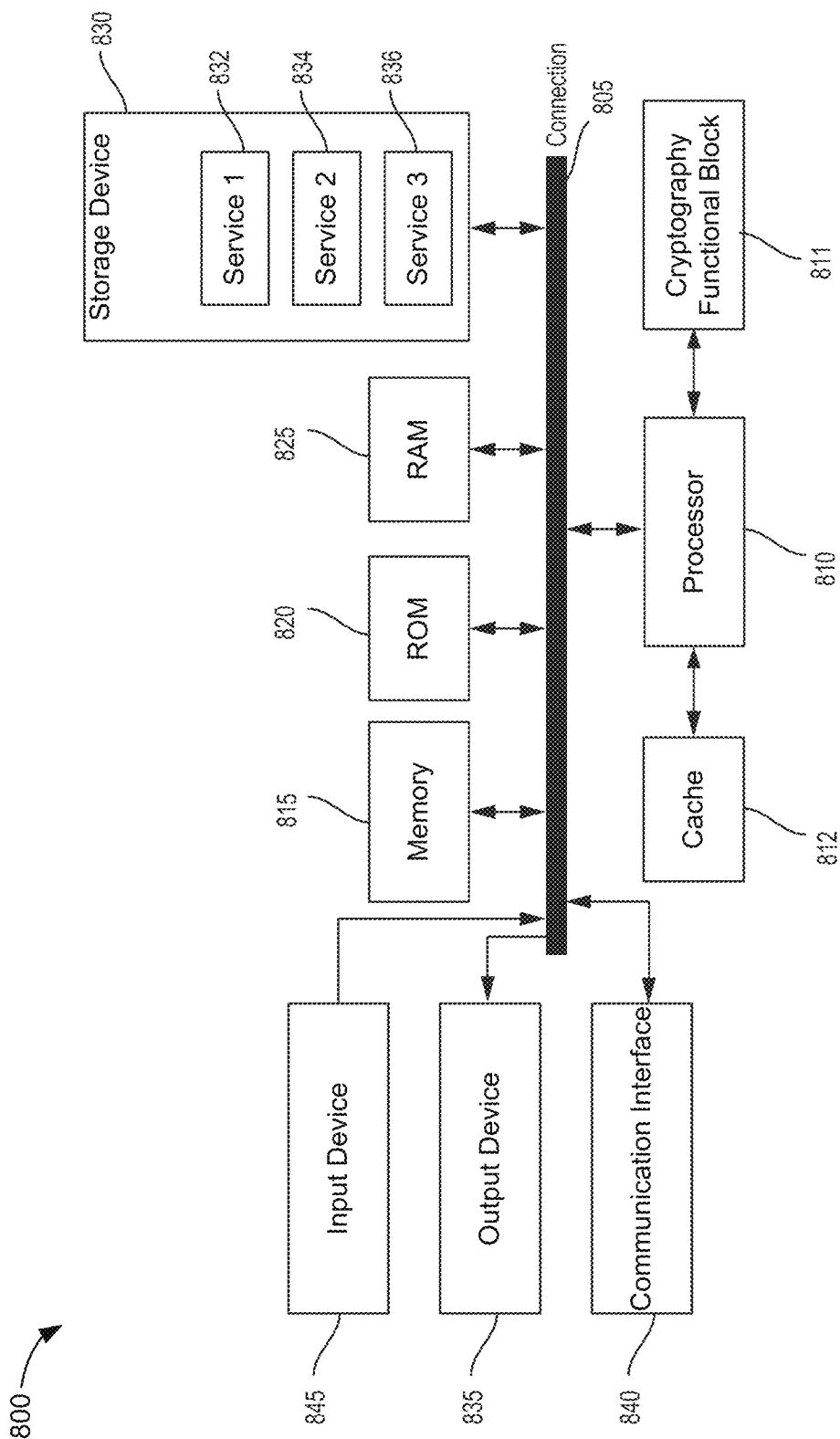
FIG. 8 is a diagram illustrating an example of a computing system, in accordance with some examples of the present disclosure.

FIG. 8 is a diagram illustrating an example of a computing system for implementing certain aspects of the present technology. In particular, FIG. 8 illustrates an example of computing system 800, which may be for example any computing device making up internal computing system, a remote computing system, a camera, or any component thereof in which the components of the system are in communication with each other using connection 805. Connection 805 may be a physical connection using a bus, or a direct connection into processor 810, such as in a chipset architecture. Connection 805 may also be a virtual connection, networked connection, or logical connection.

In some embodiments, computing system 800 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example computing system 800 includes at least one processing unit (CPU or processor) 810 and connection 805 that communicatively couples various system components including system memory 815, such as read-only memory (ROM) 820 and random access memory (RAM) 825 to processor 810. Computing system 800 may include a cache 812 of high-speed memory connected directly with, in close proximity to, or integrated as part of processor 810. The example computing system 800 also includes one or more cryptographical functional blocks 811 connected to the processor. For example, the one or more cryptographical functional blocks 811 can include cryptographical blocks for performing, without limitation, NTT computations, matrix vector multiplication (A*y), r and r.G multiplication (e.g., elliptic curve point multiplication) events (e.g., for an elliptic curve digital signature algorithm (ECDSA)), security hash algorithms, (e.g., SHA-256, SHA-3), McEliece cryptography, bit flipping key encapsulation (BIKE), Hamming quasi-cycling (HQC) encryption, hash-based message authentication code (e.g., HMAC-512), RNG seeding. In some cases, multiple cryptographical functional blocks 811 can be connected to one another directly or indirectly. In some implementations, the one or more cryptographical functional blocks 811 can include one or more co-processing units.

Processor 810 may include any general purpose processor and a hardware service or software service, such as services 832, 834, and 836 stored in storage device 830, configured to control processor 810 as well as a special-purpose processor (e.g., an arithmetic processor, a cryptographic processor, and/or any combination thereof) where software instructions are incorporated into the actual processor design. Processor 810 may essentially be a completely self-contained computing system, containing multiple cores or processors, a bus, memory controller, cache, etc. A multi-core processor may include distinct computation units of variable sizes and features. In some cases, a multi-core processor may be symmetric or asymmetric. In some examples, the one or more cryptographical functional blocks 811 may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms. In some instances, multimodal systems may enable a user to provide multiple types of input/output to communicate with computing system 800.

Computing system 800 may include communication interface 840, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 830 may include software services, servers, services, etc., that when the code that defines such software is executed by the processor 810, it causes the system to perform a function. In some embodiments, a hardware service that performs a particular function may include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, nonvolatile memory express (NVMe) memory, Write Once Read Many (WORM) memory, electronic fuse (eFuse) OTP memory, I-fuse OTP memory, gate-oxide breakdown anti-fuse memory, Intel Optane memory, memory, or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for secure processing comprising: a memory comprising instructions; and a processor coupled to the memory and configured to: obtain a plurality of instructions, wherein the plurality of instructions comprises a sequential order for execution of the plurality of instructions by the processor; determine that two or more instructions of the plurality of instructions are capable of being fused; determine that a random variable satisfies an instruction fusion condition; and execute, based on determining that the two or more instructions of the plurality of instructions are capable of being fused and the random variable satisfies the instruction fusion condition, the two or more instructions of the plurality of instructions as a single fused instruction.

Aspect 2. The apparatus of Aspect 1, wherein each instruction of the plurality of instructions is included in an instruction set architecture (ISA) of the processor.

Aspect 3. The apparatus of any of Aspects 1 to 2, wherein the two or more instructions of the plurality of instructions comprise two instructions, wherein executing the two or more instructions of the plurality of instructions with as the single fused instruction comprises combining the two instructions into a single instruction.

Aspect 4. The apparatus of any of Aspects 1 to 3, wherein the two instructions, when executed by the processor, are simultaneously executed by different hardware components of the processor.

Aspect 5. The apparatus of any of Aspects 1 to 4, wherein an idiom catalog comprises a plurality of idioms, wherein each idiom of the plurality of idioms comprises a sequence of two or more instructions capable of fusion and a respective fused instruction corresponding to the sequence of two or more instructions capable of fusion.

Aspect 6. The apparatus of any of Aspects 1 to 5, wherein, to determine that the random variable satisfies the instruction fusion condition, the processor is further configured to determine that the random variable has a value of one (1) or TRUE.

Aspect 7. The apparatus of any of Aspects 1 to 6, wherein, to execute the two or more instructions of the plurality of instructions as the single fused instruction, the processor is further configured to simultaneously execute the two or more instructions.

Aspect 8. The apparatus of any of Aspects 1 to 7, wherein executing the two or more instructions as the single fused instruction reduces a total number of operations performed by the processor relative to performing the two or more instructions of the plurality of instructions sequentially.

Aspect 9. The apparatus of any of Aspects 1 to 8, wherein the processor is further configured to: determine that a first additional instruction of the plurality of instructions is not capable of fusion with a second additional instruction of the plurality of instructions, wherein the second additional instruction of the plurality of instructions immediately follows the first additional instruction of the plurality of instructions in the sequential order for execution of the plurality of instructions by the processor; and execute, based on determining that the first additional instruction of the plurality of instructions is not capable of fusion with the second additional instruction of the plurality of instructions, the first additional instruction sequentially after execution of the single fused instruction.

Aspect 10. The apparatus of any of Aspects 1 to 9, wherein the processor is further configured to: determine that a first additional instruction of the plurality of instructions is capable of fusion with a second additional instruction of the plurality of instructions, wherein the second additional instruction of the plurality of instructions immediately follows the first additional instruction of the plurality of instructions in the sequential order for execution of the plurality of instructions by the processor; determine that a second random variable does not satisfy a second instruction fusion condition; execute, based on determining that the second random variable does not satisfy the second instruction fusion condition, the first additional instruction of the plurality of instructions sequentially after execution of the single fused instruction; and execute the second additional instruction of the plurality of instructions sequentially after execution of the first additional instruction of the plurality of instructions.

Aspect 11. The apparatus of any of Aspects 1 to 10, wherein, to determine that the second random variable does not satisfy the second instruction fusion condition, the processor is further configured to determine that the random variable has a value of zero (0) or FALSE.

Aspect 12. A method for secure processing comprising: obtaining a plurality of instructions, wherein the plurality of instructions comprises a sequential order for execution of the plurality of instructions by a processor; determining that two or more instructions of the plurality of instructions are capable of being fused; determining that a random variable satisfies an instruction fusion condition; and executing, based on determining that the two or more instructions of the plurality of instructions are capable of being fused and the random variable satisfies the instruction fusion condition, the two or more instructions of the plurality of instructions as a single fused instruction.

Aspect 13. The method of Aspect 12, wherein each instruction of the plurality of instructions is included in an ISA of the processor.

Aspect 14. The method of any of Aspects 12 to 13, wherein the two or more instructions of the plurality of instructions comprise two instructions, wherein executing the two or more instructions of the plurality of instructions with as the single fused instruction comprises combining the two instructions into a single instruction.

Aspect 15. The method of Aspect 14, wherein the two instructions, when executed by the processor, are simultaneously executed by different hardware components of the processor.

Aspect 16. The method of any of Aspects 12 to 15, wherein an idiom catalog comprises a plurality of idioms, wherein each idiom of the plurality of idioms comprises a sequence of two or more instructions capable of fusion and a respective fused instruction corresponding to the sequence of two or more instructions capable of fusion.

Aspect 17. The method of any of Aspects 12 to 16, wherein determining that the random variable satisfies the instruction fusion condition comprises determining that the random variable has a value of one (1) or TRUE.

Aspect 18. The method of any of Aspects 12 to 17, wherein executing the two or more instructions of the plurality of instructions as the single fused instruction comprises simultaneously executing the two or more instructions.

Aspect 19. The method of any of Aspects 12 to 18, wherein executing the two or more instructions as the single fused instruction reduces a total number of operations performed by the processor relative to performing the two or more instructions of the plurality of instructions sequentially.

Aspect 20. The method of any of Aspects 12 to 19, further comprising: determining that a first additional instruction of the plurality of instructions is not capable of fusion with a second additional instruction of the plurality of instructions, wherein the second additional instruction of the plurality of instructions immediately follows the first additional instruction of the plurality of instructions in the sequential order for execution of the plurality of instructions by the processor; and executing, based on determining that the first additional instruction of the plurality of instructions is not capable of fusion with the second additional instruction of the plurality of instructions, the first additional instruction sequentially after execution of the single fused instruction.

Aspect 21. The method of any of Aspects 12 to 20, further comprising: determining that a first additional instruction of the plurality of instructions is capable of fusion with a second additional instruction of the plurality of instructions, wherein the second additional instruction of the plurality of instructions immediately follows the first additional instruction of the plurality of instructions in the sequential order for execution of the plurality of instructions by the processor; determine that a second random variable does not satisfy a second instruction fusion condition; executing, based on determining that the second random variable does not satisfy the second instruction fusion condition, the first additional instruction of the plurality of instructions sequentially after execution of the single fused instruction; and executing the second additional instruction of the plurality of instructions sequentially after execution of the first additional instruction of the plurality of instructions.

Aspect 22. The method of Aspect 21, wherein determining that the second random variable does not satisfy the second instruction fusion condition comprises determining that the random variable has a value of zero (0) or FALSE.

Aspect 23. A non-transitory computer-readable medium having instructions stored thereon that, when executed by one or more processors, cause the one or more processors to: obtain a plurality of instructions, wherein the plurality of instructions comprises a sequential order for execution of the plurality of instructions by a processor, wherein the one or more processors comprises the processor; determine that two or more instructions of the plurality of instructions are capable of being fused; determine that a random variable satisfies an instruction fusion condition; and execute, based on determining that the two or more instructions of the plurality of instructions are capable of being fused and the random variable satisfies the instruction fusion condition, the two or more instructions of the plurality of instructions as a single fused instruction.

Aspect 24. The non-transitory computer-readable medium of Aspect 23, wherein each instruction of the plurality of instructions is included in an ISA of the processor.

Aspect 25. The non-transitory computer-readable medium of any of Aspects 23 to 24, wherein the two or more instructions of the plurality of instructions comprise two instructions, wherein executing the two or more instructions of the plurality of instructions with as the single fused instruction comprises combining the two instructions into a single instruction.

Aspect 26. The non-transitory computer-readable medium of Aspect 25, wherein the two instructions, when executed by the processor, are simultaneously executed by different hardware components of the processor.

Aspect 27. The non-transitory computer-readable medium of any of Aspects 23 to 26, wherein an idiom catalog comprises a plurality of idioms, wherein each idiom of the plurality of idioms comprises a sequence of two or more instructions capable of fusion and a respective fused instruction corresponding to the sequence of two or more instructions capable of fusion.

Aspect 28. The non-transitory computer-readable medium of any of Aspects 23 to 27, wherein determining that the random variable satisfies the instruction fusion condition comprises determining that the random variable has a value of one (1) or TRUE.

Aspect 29. The non-transitory computer-readable medium of any of Aspects 23 to 28, wherein executing the two or more instructions of the plurality of instructions as the single fused instruction comprises simultaneously executing the two or more instructions.

Aspect 30. The non-transitory computer-readable medium of any of Aspects 23 to 29, wherein executing the two or more instructions as the single fused instruction reduces a total number of operations performed by the processor relative to performing the two or more instructions of the plurality of instructions sequentially.

Aspect 31. An apparatus for secure processing comprising: a memory comprising instructions; and a processor coupled to the memory and configured to: obtain a plurality of instructions, wherein the plurality of instructions comprises a sequential order for execution of the plurality of instructions by the processor; determine that an instruction of the plurality of instructions is capable of an adjusted execution; determine that a random variable satisfies an instruction fusion condition; and execute, based on determining that the instruction of the plurality of instructions is capable of adjusted execution and the random variable satisfies the instruction fusion condition, the instruction as a second plurality of instructions.

Aspect 32. The apparatus of Aspect 31, wherein executing the instruction of the plurality of instructions with the adjusted execution comprises fission of the instruction into the second plurality of instructions.

Aspect 33. The apparatus of any of Aspects 31 to 32, wherein the instruction is included in an ISA of the processor.

Aspect 34. The apparatus of any of Aspects 31 to 33, wherein each instruction of the second plurality of instructions is included in an ISA of the processor.

Aspect 35. The apparatus of any of Aspects 31 to 34, wherein a fission catalog comprises a plurality of instructions capable of adjusted execution and a respective second plurality of instructions corresponding to the instruction.

Aspect 36. A non-transitory computer-readable storage medium having stored thereon instructions which, when executed by one or more processors, cause the one or more processors to perform any of the operations of aspects 1 to 30.

Aspect 37. An apparatus comprising means for performing a method according to any of Aspects 1 to 30.

Aspect 38. A non-transitory computer-readable storage medium having stored thereon instructions which, when executed by one or more processors, cause the one or more processors to perform any of the operations of aspects 31 to 35.

Aspect 39. An apparatus comprising means for secure processing according to any of Aspects 31 to 35.

Aspect 40. An apparatus comprising means for performing a method according to any of Aspects 31 to 35.

Aspect 41: A method comprising operations according to any of Aspects 31-35.

Aspect 42: A method comprising operations according to any of Aspects 1-30 and any of Aspects 31-35.

Aspect 43: An apparatus for secure processing. The apparatus includes a memory (e.g., implemented in circuitry and one or more processors (e.g., one processor or multiple processors) coupled to the memory. The one or more processors are configured to perform operations according to any of Aspects 1-30 and any of Aspects 31-35.

Aspect 44: A computer-readable storage medium storing instructions that, when executed by one or more processors, cause the one or more processors to perform operations according to any of Aspects 1-30 and any of Aspects 31-35.

Aspect 45: An apparatus comprising means for performing operations according to any of Aspects 1-30 and any of Aspects 31-35.

What is claimed is:

1. An apparatus for secure processing comprising:
a memory comprising instructions; and
a processor coupled to the memory and configured to:
obtain a plurality of instructions, wherein the plurality of instructions comprises a sequential order for execution of the plurality of instructions by the processor;
determine that two or more instructions of the plurality of instructions are capable of being fused;
determine that a random variable satisfies an instruction fusion condition; and
execute, based on determining that the two or more instructions of the plurality of instructions are capable of being fused and the random variable satisfies the instruction fusion condition, the two or more instructions of the plurality of instructions as a single fused instruction.

2. The apparatus of claim 1, wherein each instruction of the plurality of instructions is included in an instruction set architecture (ISA) of the processor.

3. The apparatus of claim 1, wherein the two or more instructions of the plurality of instructions comprise two instructions, wherein executing the two or more instructions of the plurality of instructions as the single fused instruction comprises combining the two instructions into a single instruction.

4. The apparatus of claim 3, wherein the two instructions, when executed by the processor, are simultaneously executed by different hardware components of the processor.

5. The apparatus of claim 1, wherein an idiom catalog comprises a plurality of idioms, wherein each idiom of the plurality of idioms comprises a sequence of two or more instructions capable of fusion and a respective fused instruction corresponding to the sequence of two or more instructions capable of fusion.

6. The apparatus of claim 1, wherein, to determine that the random variable satisfies the instruction fusion condition, the processor is further configured to determine that the random variable has a value of one (1) or TRUE.

7. The apparatus of claim 1, wherein, to execute the two or more instructions of the plurality of instructions as the single fused instruction, the processor is further configured to simultaneously execute the two or more instructions.

8. The apparatus of claim 1, wherein executing the two or more instructions as the single fused instruction reduces a total number of operations performed by the processor relative to performing the two or more instructions of the plurality of instructions sequentially.

9. The apparatus of claim 1, wherein the processor is further configured to:
determine that a first additional instruction of the plurality of instructions is not capable of fusion with a second additional instruction of the plurality of instructions, wherein the second additional instruction of the plurality of instructions immediately follows the first additional instruction of the plurality of instructions in the sequential order for execution of the plurality of instructions by the processor; and
execute, based on determining that the first additional instruction of the plurality of instructions is not capable of fusion with the second additional instruction of the plurality of instructions, the first additional instruction sequentially after execution of the single fused instruction.

10. The apparatus of claim 1, wherein the processor is further configured to:
determine that a first additional instruction of the plurality of instructions is capable of fusion with a second additional instruction of the plurality of instructions, wherein the second additional instruction of the plurality of instructions immediately follows the first additional instruction of the plurality of instructions in the sequential order for execution of the plurality of instructions by the processor;

determine that a second random variable does not satisfy a second instruction fusion condition;

execute, based on determining that the second random variable does not satisfy the second instruction fusion condition, the first additional instruction of the plurality of instructions sequentially after execution of the single fused instruction; and execute the second additional instruction of the plurality of instructions sequentially after execution of the first additional instruction of the plurality of instructions.

11. The apparatus of claim 10, wherein, to determine that the second random variable does not satisfy the second instruction fusion condition, the processor is further configured to determine that the random variable has a value of zero (0) or FALSE.

12. A method for secure processing comprising:

obtaining a plurality of instructions, wherein the plurality of instructions comprises a sequential order for execution of the plurality of instructions by a processor;

determining that two or more instructions of the plurality of instructions are capable of being fused;

determining that a random variable satisfies an instruction fusion condition; and executing, based on determining that the two or more instructions of the plurality of instructions are capable of being fused and the random variable satisfies the instruction fusion condition, the two or more instructions of the plurality of instructions as a single fused instruction.

13. The method of claim 12, wherein each instruction of the plurality of instructions is included in an ISA of the processor.

14. The method of claim 12, wherein the two or more instructions of the plurality of instructions comprise two instructions, wherein executing the two or more instructions of the plurality of instructions with as the single fused instruction comprises combining the two instructions into a single instruction.

15. The method of claim 14, wherein the two instructions, when executed by the processor, are simultaneously executed by different hardware components of the processor.

16. The method of claim 12, wherein an idiom catalog comprises a plurality of idioms, wherein each idiom of the plurality of idioms comprises a sequence of two or more instructions capable of fusion and a respective fused instruction corresponding to the sequence of two or more instructions capable of fusion.

17. The method of claim 12, wherein determining that the random variable satisfies the instruction fusion condition comprises determining that the random variable has a value of one (1) or TRUE.

18. The method of claim 12, wherein executing the two or more instructions of the plurality of instructions as the single fused instruction comprises simultaneously executing the two or more instructions.

19. The method of claim 12, wherein executing the two or more instructions as the single fused instruction reduces a total number of operations performed by the processor relative to performing the two or more instructions of the plurality of instructions sequentially.

20. The method of claim 12, further comprising:

determining that a first additional instruction of the plurality of instructions is capable of fusion with a second additional instruction of the plurality of instructions, wherein the second additional instruction of the plurality of instructions immediately follows the first additional instruction of the plurality of instructions in the sequential order for execution of the plurality of instructions by the processor;

determine that a second random variable does not satisfy a second instruction fusion condition;

executing, based on determining that the second random variable does not satisfy the second instruction fusion condition, the first additional instruction of the plurality of instructions sequentially after execution of the single fused instruction; and executing the second additional instruction of the plurality of instructions sequentially after execution of the first additional instruction of the plurality of instructions.

* * * * *